United States Patent
Nakano et al.

(10) Patent No.: US 10,787,540 B2
(45) Date of Patent: Sep. 29, 2020

(54) ALIPHATIC POLYCARBONATE AND BINDER RESIN COMPOSITION CONTAINING SAID POLYCARBONATE

(71) Applicants: NATIONAL UNIVERSITY CORPORATION TOKYO UNIVERSITY OF AGRICULTURE AND TECHNOLOGY, Tokyo (JP); SUMITOMO SEIKA CHEMICALS CO., LTD., Kako-gun, Hyogo (JP)

(72) Inventors: Koji Nakano, Tokyo (JP); Kiyoshi Nishioka, Himeji (JP); Shizuka Hachiken, Himeji (JP)

(73) Assignees: NATIONAL UNIVERSITY CORPORATION TOKYO UNIVERSITY OF AGRICULTURE AND TECHNOLOGY, Tokyo (JP); SUMITOMO SEIKA CHEMICALS CO., LTD, Kako-Gun, Hyogo (JP)

( * ) Notice: Subject to any disclaimer, the term of this patent is extended or adjusted under 35 U.S.C. 154(b) by 31 days.

(21) Appl. No.: 16/314,223

(22) PCT Filed: Jul. 5, 2017

(86) PCT No.: PCT/JP2017/024572
§ 371 (c)(1),
(2) Date: Dec. 28, 2018

(87) PCT Pub. No.: WO2018/008662
PCT Pub. Date: Jan. 11, 2018

(65) Prior Publication Data
US 2019/0256651 A1 Aug. 22, 2019

(30) Foreign Application Priority Data
Jul. 8, 2016 (JP) ................................. 2016-136410

(51) Int. Cl.
*C08G 64/34* (2006.01)
*C08G 64/02* (2006.01)
*C08L 69/00* (2006.01)

(52) U.S. Cl.
CPC ............. *C08G 64/02* (2013.01); *C08G 64/34* (2013.01); *C08L 69/00* (2013.01)

(58) Field of Classification Search
USPC .................................................. 528/196, 198
See application file for complete search history.

(56) References Cited

U.S. PATENT DOCUMENTS

| 2014/0008588 A1 | 1/2014 | Fujimoto et al. |
| 2016/0229955 A1 | 8/2016 | Müller et al. |
| 2018/0030203 A1 | 2/2018 | Nakano et al. |
| 2019/0256651 A1* | 8/2019 | Nakano .................. C08G 64/02 |

FOREIGN PATENT DOCUMENTS

| JP | 5-24934 A | 2/1993 |
| JP | 2011-20916 A | 2/2011 |
| JP | 2011-178606 A | 9/2011 |
| JP | 2014-9282 A | 1/2014 |
| WO | WO 2012/128028 A1 | 9/2012 |
| WO | WO 2014/133102 A1 | 9/2014 |
| WO | WO 2015/039981 A1 | 3/2015 |
| WO | WO 2016/139831 A1 | 9/2016 |

OTHER PUBLICATIONS

International Search Report, issued in PCT/JP2017/024572, dated Sep. 19, 2017.
Written Opinion of the International Searching Authority, issued in PCT/JP2017/024572, dated Sep. 19, 2017.

* cited by examiner

*Primary Examiner* — Terressa Boykin
(74) *Attorney, Agent, or Firm* — Birch, Stewart, Kolasch & Birch, LLP

(57) ABSTRACT

The present invention provides a thermally decomposable binder that achieves a reduced residual carbon after sintering, and that can be subjected to a dewaxing treatment at a relatively low temperature in a non-oxidative atmosphere. More specifically, the present invention provides an aliphatic polycarbonate that has a structure obtained by neutralizing a Brønsted acid with an organic onium salt in a side chain.

8 Claims, 1 Drawing Sheet

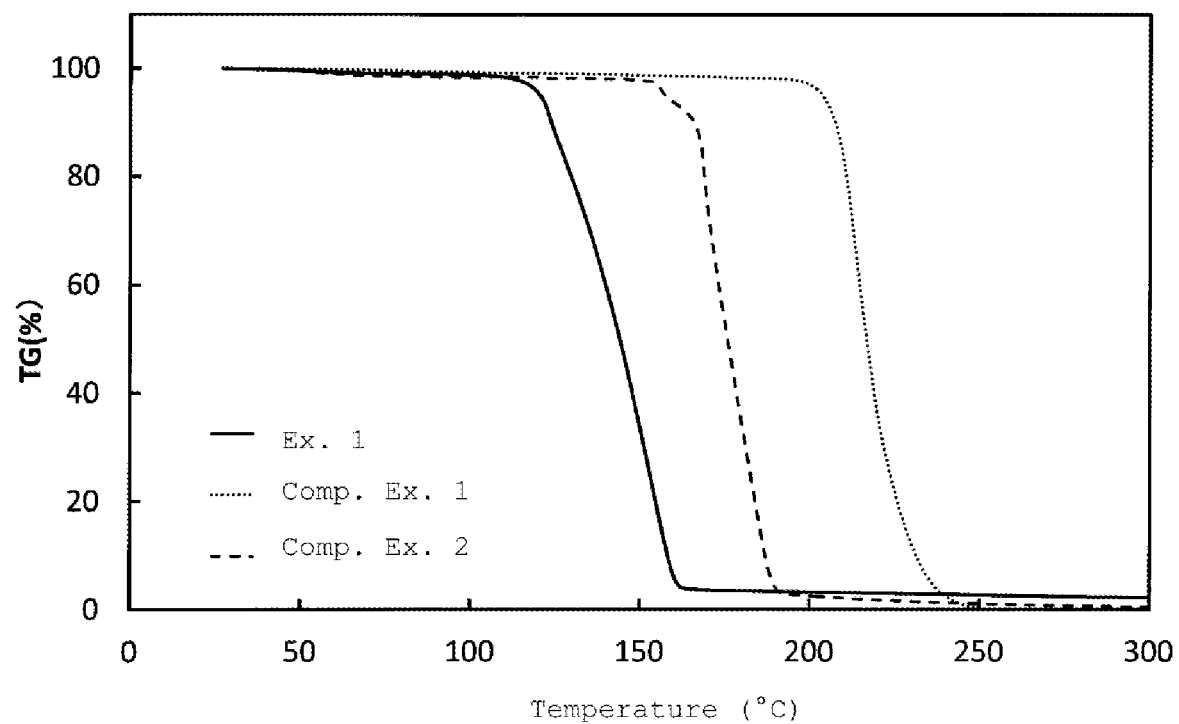

ALIPHATIC POLYCARBONATE AND BINDER RESIN COMPOSITION CONTAINING SAID POLYCARBONATE

TECHNICAL FIELD

The present invention relates to a novel aliphatic polycarbonate and a binder resin composition containing the aliphatic polycarbonate.

BACKGROUND ART

In recent years, products of various shapes have been produced by dispersing inorganic substances, such as electroconductive particles, ceramics, glass, and a phosphor, in a binder resin to obtain a paste, followed by molding and sintering. For example, a metal ink in which fine metal particles are dispersed as electroconductive particles has been used in the formation of circuits etc. on a substrate; and a ceramic paste in which ceramics are dispersed has been molded into a green sheet, and then used in the production of a multilayer ceramic capacitor or the like.

Conventionally, ethyl cellulose, polyvinyl butyral, poly (methyl methacrylate), and the like have been used as binder resins. For these binder resins, the dewaxing temperature is as high as 300° C. or higher, and the residual carbon is in a large amount, so that enormous energy would be required in the production of a molded article etc. Further, when inorganic fine particles that are susceptible to reaction with oxygen are handled, dewaxing is preferably performed in a non-oxidative atmosphere; in this case, however, the temperature required for dewaxing would be even higher, or a two-step process must be conducted in which dewaxing is once performed in an oxidative atmosphere, and then sintering is performed in a reducing atmosphere. In view of the above, a binder resin has been desired for which dewaxing can be performed at a lower temperature even in a non-oxidative atmosphere, as in an oxidative atmosphere.

In order to meet such demands, studies have been conducted with respect to a metal paste, ceramic paste, glass paste, etc., obtained by using, as a low-temperature decomposable binder resin, a polycarbonate produced from carbon dioxide and an epoxide, since this polycarbonate has a decomposition temperature as low as 200 to 250° C. even in a non-oxidative atmosphere (e.g., Patent Literature (PTL) 1, PTL 2, and PTL 3).

CITATION LIST

Patent Literature

PTL 1: WO2012/128028
PTL 2: JPH05-24934A
PTL 3: JP2011-178606A

SUMMARY OF INVENTION

Technical Problem

However, there are increasing demands on the conservation of energy in recent years. Also, for example, when it is attempted to form a circuit by using a metal paste on a plastic substrate as in a flexible device, there lies a problem to be solved; i.e., a circuit cannot be formed since almost all plastic substrates have a heat-resistant temperature lower than the decomposition temperature of a binder resin.

Accordingly, a binder resin for which dewaxing can be performed at low temperatures has been in demand.

Solution to Problem

As a result of extensive research, the present inventors found that an aliphatic polycarbonate having a structure obtained by neutralizing a Brønsted acid with an organic base in a side chain, i.e., having a structure of organic onium salt in a side chain, exhibits thermally decomposable properties at low temperatures, and that when this aliphatic polycarbonate is used as a binder resin, dewaxing can be sufficiently performed even at low temperatures (preferably 220° C. or lower). The present inventors further conducted extensive research. The present invention has thus been completed.

The present invention encompasses, for example, the subject matter of the following items.

Item 1. An aliphatic polycarbonate comprising a constituent unit represented by formula (1):

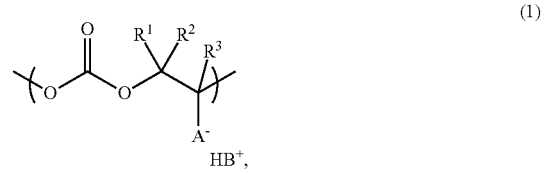

wherein $R^1$, $R^2$, and $R^3$ are identical or different, and each represents a hydrogen atom, an alkyl group having 1 to 10 carbon atoms, or an aryl group having 6 to 20 carbon atoms, $A^-$ represents a conjugate base of a Brønsted acid, and $HB^+$ represents an organic onium ion.

Item 2. The aliphatic polycarbonate according to Item 1, wherein $HB^+$ in formula (1) represents a conjugate acid of an organic amine compound.

Item 3. The aliphatic polycarbonate according to Item 2, wherein the organic amine compound is at least one member selected from the group consisting of 1,8-diazabicyclo[5.4.0]undec-7-ene, 1,4-diazabicyclo[2.2.2]octane, and 7-methyl-1,5,7-triazabicyclo[4.4.0]dec-5-ene.

Item 4. The aliphatic polycarbonate according to any one of Items 1 to 3, comprising a constituent unit represented by formula (1'), wherein $A^-$ in formula (1) represents a conjugate base ($COO^-$) of a carboxylic acid:

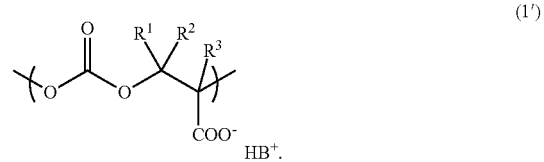

Item 5. The aliphatic polycarbonate according to any one of Items 1 to 4, further comprising a constituent unit represented by formula (2):

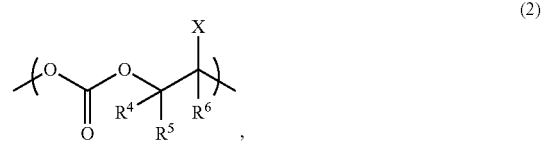

wherein R⁴, R⁵, and R⁶ are identical or different, and each represents a hydrogen atom, an alkyl group having 1 to 10 carbon atoms, or an aryl group having 6 to 20 carbon atoms, wherein two groups from among R⁴ to R⁶, taken together with the carbon atom or carbon atoms to which these groups are attached, may form a substituted or unsubstituted, saturated or unsaturated aliphatic ring, and X represents a hydrogen atom, an alkyl group having 1 to 10 carbon atoms, a haloalkyl group having 1 to 10 carbon atoms, a cycloalkyl group having 3 to 12 carbon atoms, an ether bond-containing group, an ester bond-containing group, or an allyl group.

Item 6. The aliphatic polycarbonate according to any one of Items 1 to 5, wherein the content of the constituent unit represented by formula (1) is 0.01 to 30 mol %.

Item 7. The aliphatic polycarbonate according to any one of Items 1 to 6, wherein the 95% decomposition temperature in a thermogravimetric analysis in a nitrogen atmosphere is 220° C. or lower (preferably 200° C. or lower, more preferably 180° C. or lower, and still more preferably 175° C. or lower, 170° C. or lower, or 165° C. or lower) (more preferred is the aliphatic polycarbonate in which the above 95% decomposition temperature conditions are satisfied, and the 5% decomposition temperature is 150° C. or lower, or the aliphatic polycarbonate in which the above 95% decomposition temperature conditions are satisfied, and the 50% decomposition temperature is 190° C. or lower; and still more preferred is the aliphatic polycarbonate in which the above 95% decomposition temperature conditions are satisfied, the 50% decomposition temperature is 190° C. or lower, and that the 5% decomposition temperature is 150° C. or lower).

Item 8. A binder resin composition comprising the aliphatic polycarbonate of any one of Items 1 to 7.

Advantageous Effects of Invention

The use of the aliphatic polycarbonate of the present invention as a binder resin makes a substantial conservation of energy possible, and calcination on a resin substrate having a low heat resistance possible.

BRIEF DESCRIPTION OF DRAWINGS

FIG. 1 is a graph showing TG curves of the aliphatic polycarbonate obtained in Example 1 and the aliphatic polycarbonates obtained in Comparative Examples 1 and 2.

DESCRIPTION OF EMBODIMENTS

The aliphatic polycarbonate according to the present invention encompasses an aliphatic polycarbonate comprising a constituent unit represented by formula (1):

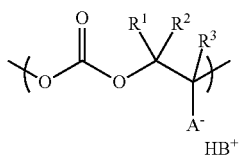

(1)

wherein R¹, R², and R³ are identical or different, and each represents a hydrogen atom, an alkyl group, or an aryl group, A⁻ represents a conjugate base of a Brønsted acid, and HB⁺ represents an organic onium ion.

As stated above, R¹, R², and R³ are identical or different. More specifically, it is possible that R¹, R², and R³ are all identical, that R¹ and R² are identical while R³ is different, that R² and R³ are identical while R¹ is different, or that R¹, R², and R³ are all different.

The number of carbon atoms of the alkyl group represented by R¹, R², and R³ is 1 to 10, and preferably 1 to 4. The alkyl group is preferably a linear or branched, substituted or unsubstituted alkyl group. Examples include a methyl group, an ethyl group, an n-propyl group, an isopropyl group, an n-butyl group, a sec-butyl group, a tert-butyl group, an n-pentyl group, an n-hexyl group, an n-heptyl group, an n-octyl group, an n-nonyl group, an n-decyl group, and the like. The alkyl group may be substituted with one or more substituents selected from, for example, an alkoxy group, an ester group, a silyl group, a sulfanyl group, a cyano group, a nitro group, a sulfo group, a formyl group, an aryl group, a halogen atom, and the like.

The number of carbon atoms of the aryl group represented by R¹, R², and R³ is 6 to 20, and preferably 6 to 14. Examples of the aryl group include a phenyl group, an indenyl group, a naphthyl group, a tetrahydronaphthyl group, and the like. The aryl group may be substituted with one or more substituents selected from, for example, alkyl groups (e.g., a methyl group, an ethyl group, an n-propyl group, an isopropyl group, an n-butyl group, a sec-butyl group, and a tert-butyl group), other aryl groups (e.g., a phenyl group and a naphthyl group), an alkoxy group, an ester group, a silyl group, a sulfanyl group, a cyano group, a nitro group, a sulfo group, a formyl group, a halogen atom, and the like.

Although there is no particular limitation, it is preferable that R¹, R², and R³ be identical or different, and each represent a hydrogen atom or an alkyl group having 1 to 4 carbon atoms. In particular, it is preferable that R¹, R², and R³ each represent a hydrogen atom.

Examples of the conjugate base A⁻ of a Brønsted acid include a conjugate base, such as carboxylate, alkoxide, phenoxide, sulfonate, sulfinate, sulfenate, imidate, phosphonate, and phosphinate, with carboxylate (COO⁻) being particularly preferable.

Examples of the organic onium ion HB⁺ include organic oxonium ions, organic sulfonium ions, organic phosphonium ions, organic arsonium ions, aminium ions, pyridinium ions, imidazolium ions, guanidinium ions, amidinium ions, and the like. The organic onium ion HB⁺ is preferably an organic amine ion, such as an aminium ion, a pyridinium ion, an imidazolium ion, a guanidinium ion, and an amidinium ion, and particularly preferably an aminium ion, a guanidinium ion, or an amidinium ion. More specifically, preferable examples include the following amidinium ion:

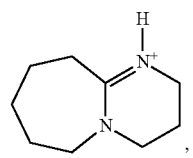 [SMILES: C1CCC2=[NH+]CCCN2CC1 ; ","]

the following amidinium ion:

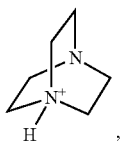

and the following guanidinium ion:

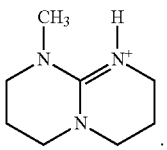

Of these, the amidinium ion above or the guanidinium ion above is particularly preferable.

The aliphatic polycarbonate of the present invention may consist only of the constituent unit represented by formula (1). However, in addition to the constituent unit represented by formula (1), the aliphatic polycarbonate of the present invention preferably also comprises a constituent unit represented by formula (2):

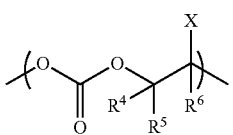

(2)

wherein $R^4$, $R^5$, and $R^6$ are identical or different, and each represents a hydrogen atom, an alkyl group having 1 to 10 carbon atoms, or an aryl group having 6 to 20 carbon atoms, wherein two groups from among $R^4$ to $R^6$, taken together with the carbon atom or carbon atoms to which these groups are attached, may form a substituted or unsubstituted, saturated or unsaturated aliphatic ring, and X represents a hydrogen atom, an alkyl group having 1 to 10 carbon atoms, a haloalkyl group having 1 to 10 carbon atoms, a cycloalkyl group having 3 to 12 carbon atoms, an ether bond-containing group, an ester bond-containing group, or an allyl group.

As stated above, $R^4$, $R^5$, and $R^6$ are identical or different. Specifically, it is possible that $R^4$, $R^5$, and $R^6$ are all identical, that $R^4$ and $R^5$ are identical while $R^6$ is different, that $R^5$ and $R^6$ are identical while $R^4$ is different, or that $R^4$, $R^5$, and $R^6$ are all different.

The number of carbon atoms of the alkyl group represented by $R^4$, $R^5$, and $R^6$ is 1 to 10, and preferably 1 to 4. The alkyl group is preferably a linear or branched, substituted or unsubstituted alkyl group. Examples include a methyl group, an ethyl group, an n-propyl group, an isopropyl group, an n-butyl group, a sec-butyl group, a tert-butyl group, an n-pentyl group, an n-hexyl group, an n-heptyl group, an n-octyl group, an n-nonyl group, an n-decyl group, and the like. The alkyl group may be substituted with one or more substituents selected from, for example, an alkoxy group, an ester group, a silyl group, a sulfanyl group, a cyano group, a nitro group, a sulfo group, a formyl group, an aryl group, a halogen atom, and the like.

The number of carbon atoms of the aryl group represented by $R^4$, $R^5$, and $R^6$ is 6 to 20, and preferably 6 to 14. Examples of the aryl group include a phenyl group, an indenyl group, a naphthyl group, a tetrahydronaphthyl group, and the like. The aryl group may be substituted with one or more substituents selected from, for example, alkyl groups, such as a methyl group, an ethyl group, an n-propyl group, an isopropyl group, an n-butyl group, a sec-butyl group, and a tert-butyl group, other aryl groups, such as a phenyl group and a naphthyl group, an alkoxy group, an ester group, a silyl group, a sulfanyl group, a cyano group, a nitro group, a sulfo group, a formyl group, a halogen atom, and the like.

X above represents a hydrogen atom, an alkyl group (in particular, a linear or branched alkyl group) having 1 to 10 carbon atoms, a haloalkyl group having 1 to 10 carbon atoms, a cycloalkyl group having 3 to 12 carbon atoms, an ether bond-containing group, an ester bond-containing group, or an allyl group. X is preferably a hydrogen atom or a linear or branched alkyl group having 1 to 4 carbon atoms, and more preferably a hydrogen atom, a methyl group, or an ethyl group.

The substituted or unsubstituted, saturated or unsaturated aliphatic ring formed by two groups from among the groups represented by $R^4$ to $R^6$, taken together with the carbon atom or carbon atoms to which these two groups are attached is preferably, for example, a 3- to 8-membered aliphatic ring, and more preferably a 3- to 8-membered, unsubstituted, saturated or unsaturated aliphatic ring. More specifically, preferable examples include a cyclopentane ring, a cyclopentene ring, a cyclohexane ring, a cyclohexene ring, a cycloheptane ring, and the like.

The alkyl group represented by X may be linear or branched and has 1 to 10, preferably 1 to 4, carbon atoms. Specific examples include a methyl group, an ethyl group, an n-propyl group, an isopropyl group, an n-butyl group, a sec-butyl group, a tert-butyl group, an n-pentyl group, an n-hexyl group, an n-heptyl group, an n-octyl group, an n-nonyl group, an n-decyl group, and the like. Of these, a methyl group, an ethyl group, an n-propyl group, an n-butyl group, and the like are more preferable.

The number of carbon atoms of the haloalkyl group is 1 to 10, and preferably 1 to 4. Examples of the haloalkyl group include a fluoromethyl group, a chloromethyl group, a bromomethyl group, an iodomethyl group, and the like.

The number of carbon atoms of the cycloalkyl group is 3 to 12, and preferably 5 to 10. Examples of the cycloalkyl group include a cyclopropyl group, a cyclobutyl group, a cyclopentyl group, a methylcyclopentyl group, a dimethylcyclopentyl group, a cyclohexyl group, a methylcyclohexyl group, a dimethylcyclohexyl group, a cycloheptyl group, and the like.

The ether bond-containing group is preferably an alkyl group having 1 to 4 carbon atoms substituted with an alkoxy group having 1 to 4 carbon atoms, an alkenyloxy group having 2 to 6 carbon atoms (e.g., an allyloxy group), an aryloxy group having 6 to 20 carbon atoms, a trialkylsilyloxy group (e.g., a trimethylsilyloxy group), and the like. More specific examples include a methoxymethyl group, an ethoxymethyl group, an allyloxymethyl group, and the like.

The ester bond-containing group is preferably an alkyl group having 1 to 4 carbon atoms substituted with an acyloxy group having 1 to 4 carbon atoms, a benzyloxycarboxy group, and the like. Examples include an acetoxymethyl group, a butyryloxymethyl group, and the like.

Of these, it is preferable that $R^4$, $R^5$, and $R^6$ be identical or different, and each represent a hydrogen atom or an alkyl group having 1 to 4 carbon atoms. In particular, $R^4$, $R^5$, and $R^6$ each preferably represent a hydrogen atom. Further, X is preferably an alkyl group having 1 to 4 carbon atoms, and particularly preferably a methyl group or an ethyl group.

When the aliphatic polycarbonate of the present invention comprises the constituent unit represented by formula (2), in addition to the constituent unit represented by formula (1), it is preferable that $R^1$ and $R^4$ be identical, $R^2$ and $R^5$ be identical, and $R^3$ and $R^6$ be identical, although there is no particular limitation.

The aliphatic polycarbonate of the present invention may further comprise a constituent unit other than the constituent unit represented by formula (1) and the constituent unit represented by formula (2), to an extent that the effects of the present invention are not impaired. It is also possible that the aliphatic polycarbonate of the present invention consist only of the constituent unit represented by formula (1), or consist only of the constituent unit represented by formula (1) and the constituent unit represented by formula (2).

Examples of the method for producing the aliphatic polycarbonate of the present invention include a method comprising subjecting an epoxide and carbon dioxide to polymerization in the presence of a metal catalyst.

In terms of the aliphatic polycarbonate above, the epoxide usable for producing an aliphatic polycarbonate comprising the constituent unit represented by formula (1) is preferably an epoxide in which a carboxy group, hydroxy group, sulfonic acid group, sulfinic acid group, sulfenic acid group, imidic acid group, phosphonic acid group, phosphinic acid group, or the like is protected with a protecting group, such as an alkyl group having 1 to 10 carbon atoms, an aralkyl group having 7 to 20 carbon atoms, an allyl group, or a trioxabicyclo[2,2,2]octyl group (the OH group that is present at an end is preferably protected). As is clear from this, $A^-$ in formula (1) is preferably obtained by releasing $H^+$ from a carboxy group, hydroxy group, sulfonic acid group, sulfinic acid group, sulfenic acid group, imidic acid group, phosphonic acid group, or phosphinic acid group.

Of these epoxides, an epoxide in which a carboxy group is protected with a protecting group is particularly preferable. Examples of such an epoxide include methyl 2-oxiranylacetate, methyl 3-oxiranylpropionate, benzyl 2-oxiranylacetate, benzyl 3-oxiranylpropionate, allyl 2-oxiranylacetate, allyl 3-oxiranylpropionate, tert-butyl 2-oxiranylacetate, tert-butyl 3-oxiranylpropionate, oxabicyclo[2,2,2]octyl 2-oxiranylacetate, oxabicyclo[2,2,2]octyl 3-oxiranylpropionate, and the like. The aliphatic polycarbonate comprising the constituting unit represented by formula (1) is obtained by copolymerizing an epoxide mentioned above with carbon dioxide to give a precursor of a carboxy-containing aliphatic polycarbonate in which the carboxy group is protected (a protected carboxy-containing aliphatic polycarbonate), performing an appropriate deprotection reaction, and neutralizing the carboxy group with an organic base. In particular, preferred is a method in which benzyl 2-oxiranylaceate is used as an epoxide, deprotection is performed by a hydrogenation reaction, and neutralization is performed with an organic base in an organic solvent, from the viewpoint of ease in synthesis. In this case, an aliphatic polycarbonate comprising the constituent unit represented by formula (1'), wherein $A^-$ in formula (1) is the conjugate base of a carboxylic acid, is produced.

Examples of epoxides usable for producing an aliphatic polycarbonate comprising the constituent unit represented by formula (2) include ethylene oxide, propylene oxide, 1-butene oxide, 2-butene oxide, isobutylene oxide, 1-pentene oxide, 2-pentene oxide, 1-hexene oxide, 1-octene oxide, 1-dodecene oxide, cyclopentene oxide, cyclohexene oxide, styrene oxide, vinylcyclohexane oxide, 3-phenylpropylene oxide, 3,3,3-trifluoropropylene oxide, 3-naphthylpropylene oxide, 3-phenoxypropylene oxide, 3-naphthoxypropylene oxide, butadiene monoxide, 3-vinyloxypropylene oxide, 3-trimethylsilyloxypropylene oxide, and the like. Of these, ethylene oxide and propylene oxide are particularly preferred from the viewpoint of having high reactivities.

Examples of the metal catalyst include zinc-based catalysts, aluminum-based catalysts, chromium-based catalysts, cobalt-based catalysts, and the like. Of these, zinc-based catalysts and cobalt-based catalysts are preferably used because of having high polymerization activities in the polymerization reaction of an epoxide and carbon dioxide.

Examples of the zinc-based catalyst include organozinc catalysts, such as zinc acetate, diethylzinc, and dibutylzinc; organozinc catalysts obtainable by reacting a zinc compound with a compound such as a primary amine, a dihydric phenol (benzenediol), an aromatic dicarboxylic acid, an aromatic hydroxy acid, an aliphatic dicarboxylic acid, or an aliphatic monocarboxylic acid; and the like. Among these organozinc catalysts, organozinc catalysts obtainable by reacting a zinc compound, an aliphatic dicarboxylic acid, and an aliphatic monocarboxylic acid are preferred, and organozinc catalysts obtainable by reacting zinc oxide, glutaric acid, and acetic acid are more preferred, because of having even higher polymerization activities.

Examples of usable cobalt-based catalysts include a cobalt complex represented by formula (3):

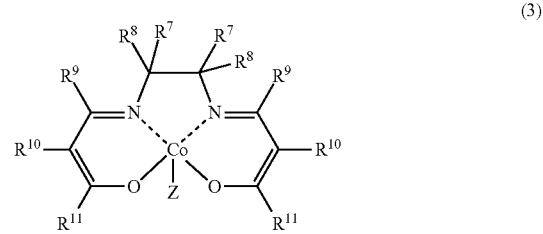

wherein $R^7$ and $R^8$ are identical or different, and each represents a hydrogen atom, a substituted or unsubstituted alkyl group, a substituted or unsubstituted aromatic group, or a substituted or unsubstituted aromatic heterocyclic ring group, or two $R^7$s or two $R^8$s taken together may form a substituted or unsubstituted, saturated or unsaturated aliphatic ring; $R^9$, $R^{10}$, and $R^{11}$ are identical or different, and each represents a hydrogen atom, a substituted or unsubstituted alkyl group, a substituted or unsubstituted alkenyl group, a substituted or unsubstituted aromatic group, a substituted or unsubstituted aromatic heterocyclic ring group, a substituted or unsubstituted alkoxy group, a substituted or unsubstituted acyl group, a substituted or unsubstituted alkoxycarbonyl group, a substituted or unsubstituted aromatic oxycarbonyl group, or a substituted or unsubstituted aralkyloxycarbonyl group, or $R^{10}$ and $R^{11}$ attached to adjacent carbon atoms taken together may form a substituted or unsubstituted aliphatic ring or a substituted or unsubstituted aromatic ring; and Z is an anionic ligand selected from the group consisting of $F^-$, $Cl^-$, $Br^-$, $I^-$, $N_3^-$, $CF_3SO_3^-$, $p\text{-}CH_3C_6H_4SO_3^-$, $BF_4^-$, $NO_2^-$, $NO_3^-$, $OH^-$, $PF_6^-$, $BPh_4^-$, $SbF_6^-$, $ClO_4^-$, $OTf^-$, $OTs^-$, an aliphatic carboxylate, an aromatic carboxylate, an alkoxide, and an aromatic oxide.

Among the cobalt complexes represented by formula (3), preferred is a cobalt complex represented by formula (4):

(4)

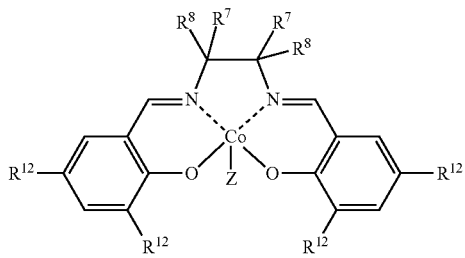

wherein $R^7$ and $R^8$ are identical or different, and each represents a hydrogen atom, a substituted or unsubstituted alkyl group, a substituted or unsubstituted aromatic group, or a substituted or unsubstituted aromatic heterocyclic group, or two $R^7$s or two $R^8$s taken together may form a substituted or unsubstituted, saturated or unsaturated aliphatic ring; each $R^{12}$ is independently a hydrogen atom, an alkyl group having 1 to 6 carbon atoms, an alkoxy group having 1 to 6 carbon atoms, a substituted or unsubstituted aromatic group, or a halogen atom; and Z is an anionic ligand selected from the group consisting of $F^-$, $Cl^-$, $Br^-$, $I^-$, $N_3^-$, $CF_3SO_3^-$, $p\text{-}CH_3C_6H_4SO_3^-$, $BF_4^-$, $NO_2^-$, $NO_3^-$, $OH^-$, $PF_6^-$, $BPh_4^-$, $SbF_6^-$, $ClO_4^-$, $OTf^-$, $OTs^-$, an aliphatic carboxylate, an aromatic carboxylate, an alkoxide, and an aromatic oxide.

Among the cobalt complexes represented by formula (4), specific preferred examples include cobalt complexes represented by the following formulae (4-1) to (4-5).

(4-1)

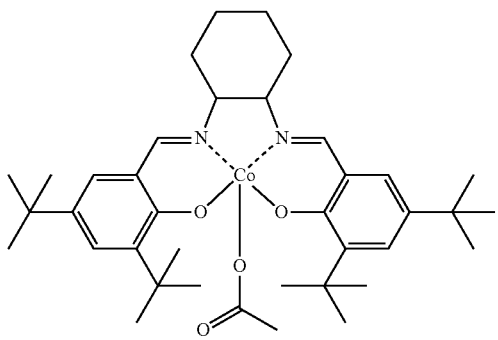

(4-2)

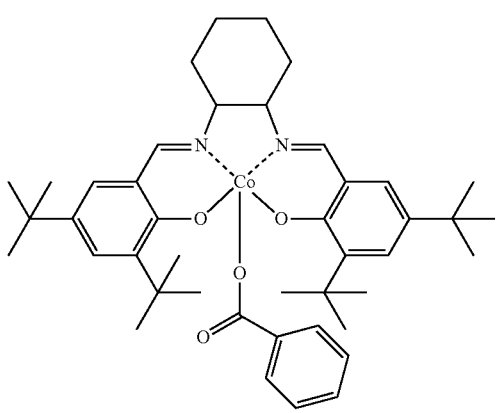

(4-3)

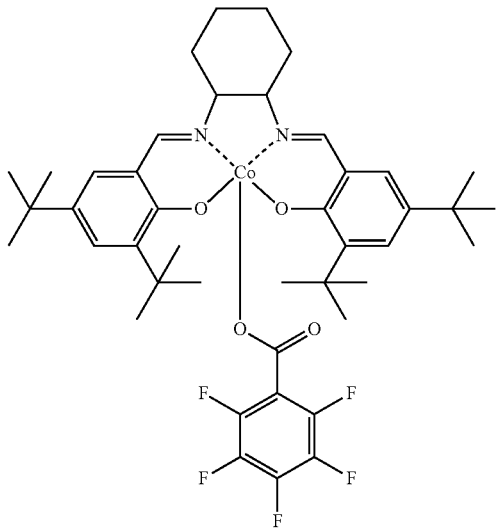

(4-4)

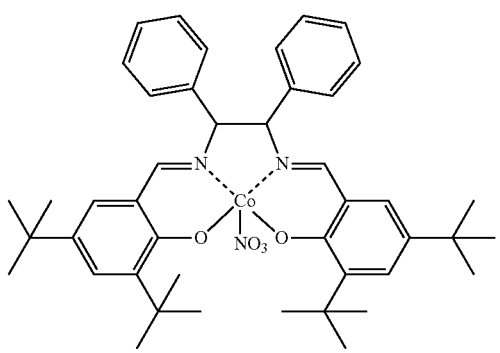

(4-5)

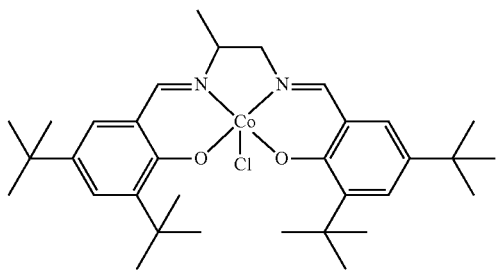

The amount of the metal catalyst used in the polymerization reaction is preferably 0.001 parts by mass or more, and more preferably 0.01 parts by mass or more, based on 100 parts by mass of the epoxide, from the viewpoint of accelerating the progress of the polymerization reaction. Further, the amount is preferably 20 parts by mass or less, and more preferably 10 parts by mass or less, based on 100 parts by mass of the epoxide, from the viewpoint of obtaining the effects that measure up to the amount used.

The above polymerization reaction may be carried out optionally in the presence of a cocatalyst, in addition to the metal catalyst. Examples of the cocatalyst include bis(triphenylphosphoranylidene) ammonium chloride (PPNCl), piperidine, bis(triphenylphosphoranylidene) ammonium fluoride (PPNF), bis(triphenylphosphoranylidene) ammonium pentafluorobenzoate ($PPNOBzF_5$), tetra-n-butylammonium chloride ($nBu_4NCl$), tetra-n-butylammonium bromide (nBu₄NBr), tetra-n-butylammonium iodide (nBu₄NI), tetra-n-butylammonium acetate (nBu₄NOAc), tetra-n-butylammonium nitrate (nBu₄NO₃), triethyl phosphine (Et₃P), tri-n-butyl phosphine (nBu₃P), triphenyl phosphine (Ph₃P), pyridine, 4-methylpyridine, 4-formylpyridine, 4-(N,N-dimethylamino)pyridine, N-methylimidazole, N-ethylimidazole, N-propylimidazole, and the like. Among these, PPNCl, PPNF, PPNOBzF₅, and nBu₄NCl are preferred, and PPNCl and PPNF are more preferred, from the viewpoint of having high reaction activities.

The amount of the cocatalyst used is preferably 0.1 to 10 mol, more preferably 0.3 to 5 mol, and even more preferably 0.5 to 1.5 mol, based on one mole of the metal catalyst.

In the above polymerization reaction, a reaction solvent may be optionally used. The reaction solvent is not particularly limited, and various organic solvents can be used. Examples of the organic solvent include aliphatic hydrocarbon-based solvents, such as pentane, hexane, octane, decane, and cyclohexane; aromatic hydrocarbon-based solvents, such as benzene, toluene, and xylene; halogenated hydrocarbon-based solvents, such as methylene chloride, chloroform, carbon tetrachloride, 1,1-dichloroethane, 1,2-dichloroethane, ethyl chloride, trichloroethane, 1-chloropropane, 2-chloropropane, 1-chlorobutane, 2-chlorobutane, 1-chloro-2-methylpropane, chlorobenzene, and bromobenzene; ether-based solvents, such as dimethoxyethane, tetrahydrofuran, 2-methyltetrahydrofuran, 1,4-dioxane, and 1,3-dioxolane; ester-based solvents, such as ethyl acetate, n-propyl acetate, and isopropyl acetate; amide-based solvents, such as N,N-dimethylformamide and N,N-dimethylacetamide; carbonate-based solvents, such as dimethyl carbonate, ethyl methyl carbonate, diethyl carbonate, and propylene carbonate; and the like.

The amount of the reaction solvent used is preferably from 100 to 10000 parts by mass, based on 100 parts by mass of the epoxide, to allow the reaction to smoothly proceed.

Examples of the method for carrying out a polymerization reaction of an epoxide and carbon dioxide in the presence of a metal catalyst include, but are not particularly limited to, a method comprising charging an autoclave with an epoxide, a metal catalyst, and optionally a cocatalyst, a reaction solvent, and the like, mixing the contents, and pressurizing the autoclave with carbon dioxide to allow a reaction to proceed.

The amount of carbon dioxide used in the above polymerization reaction is preferably 1 to 10 mol, more preferably 1 to 5 mol, and even more preferably 1 to 3 mol, based on one mole of the epoxide.

The pressure of the carbon dioxide in the polymerization reaction is not particularly limited, and is preferably 0.1 MPa or more, more preferably 0.2 MPa or more, and even more preferably 0.5 MPa or more, to allow the reaction to smoothly proceed. Further, the pressure is preferably 20 MPa or less, more preferably 10 MPa or less, and even more preferably 5 MPa or less, from the viewpoint of obtaining effects that measure up to the pressure used.

The polymerization reaction temperature in the polymerization reaction is not particularly limited, and is preferably 0° C. or higher, more preferably 10° C. or higher, and even more preferably 20° C. or higher, from the viewpoint of shortening the reaction time. Further, the polymerization reaction temperature is preferably 100° C. or lower, more preferably 90° C. or lower, and even more preferably 80° C. or lower, from the viewpoint of controlling side reactions, thereby increasing the yields.

The polymerization reaction time cannot be unconditionally determined because the polymerization reaction time differs depending upon the polymerization reaction conditions. For example, the polymerization reaction time is preferably about 1 to 40 hours.

The content of the constituent unit represented by formula (1) in the thus-obtained aliphatic polycarbonate is preferably 30% by mole or less, more preferably 20% by mole or less, and even more preferably 10% by mole or less, based on the entire constituent units constituting the aliphatic polycarbonate, from the viewpoint of reducing the residual carbon after thermal decomposition. Further, the content is preferably 0.01% by mole or more, more preferably 0.1% by mole or more, even more preferably 0.5% by mole or more, and still even more preferably 1% by mole or more, from the viewpoint of lowering the decomposition temperature. From the above viewpoints, the content of the constituent unit represented by formula (1) is preferably 0.01 to 30% by mole, more preferably 0.1 to 20% by mole, even more preferably 0.5 to 20% by mole, and still even more preferably 1 to 10% by mole, based on the entire constituent units constituting the aliphatic polycarbonate.

As stated above, the aliphatic polycarbonate of the present invention may further comprise a constituent unit other than the constituent unit represented by formula (1), to an extent that the effects of the present invention are not impaired. Examples of the constituent unit other than the constituent unit represented by formula (1) include a constituent unit represented by formula (2). Examples also include a constituent unit represented by formula (1) in which "-A⁻ HB⁺" is "-A." More specifically, this constituent unit is represented by formula (1a):

(1a)

wherein $R^1$, $R^2$, and $R^3$ are as defined above, and A represents a Brønsted acid group.

The Brønsted acid group represented by A here is preferably a group whose conjugate base A⁻ is a conjugate base, such as carboxylate, alkoxide, phenoxide, sulfonate, sulfinate, sulfenate, imidate, phosphonate, or phosphinate. More specifically, the Brønsted acid group represented by A is preferably a carboxy group (—COOH), a hydroxyl group (—OH), a 2, 3, or 4-hydroxyphenyl group (—C₆H₄—OH), a sulfone group (—SO₃H), a sulfino group (—SO₂H), a sulfenic group (—SOH), an imidic acid group, a phosphono group (—P(=O) (OH)₂), a phosphine group (—P(=O) (OH)H), or the like, with a carboxy group being particularly preferable. When A represents a carboxy group, the constituent unit is represented by formula (1a'):

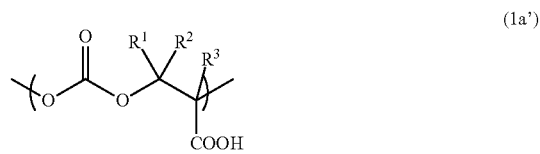

(1a')

wherein $R^1$, $R^2$, and $R^3$ are as defined above.

The aliphatic polycarbonate of the present invention may consist only of the constituent unit represented by formula (1), consist only of the constituent unit represented by formula (1) and the constituent unit represented by formula (1a), consist only of the constituent unit represented by formula (1) and the constituent unit represented by formula (2), or consist only of the constituent unit represented by formula (1), the constituent unit represented by formula (1a), and the constituent unit represented by formula (2).

When the aliphatic polycarbonate of the present invention comprises the constituent unit represented by formula (1) and the constituent unit represented by formula (1a) (particularly preferably when the aliphatic polycarbonate of the present invention consists only of the constituent unit represented by formula (1) and the constituent unit represented by formula (1a)), "A" in the constituent unit represented by formula (1a) and "A$^-$" in the constituent unit represented by formula (1) may be independent from each other or identical (i.e., "A"="A$^-$H$^+$"), and are preferably identical. That is, the conjugate base "A$^-$" of a Brønsted acid in the constituent unit represented by (1) is preferably the conjugate base of the Brønsted acid "A" in the constituent unit represented by formula (1a).

Further, when the aliphatic polycarbonate of the present invention comprises the constituent unit represented by formula (1) and the constituent unit represented by formula (1a), the content of the constituent unit represented by formula (1) is preferably 30 or more, more preferably 40 or more, and still more preferably 50 or more, based on the total content (mol %) of the constituent unit represented by formula (1) and the constituent unit represented by formula (1a) contained in the aliphatic polycarbonate, taken as 100. The amount of the constituent unit represented by formula (1) may also be 60 or more, 70 or more, 80 or more, 90 or more, or 95 or more. In particular, when "A" and "A$^-$" are identical (i.e., "A"="A$^-$H$^+$"), the numerical value representing the amount of the constituent unit represented by formula (1) may be considered as representing the degree of neutralization.

For the content of each constituent unit, the content of the constituent unit represented by formula (1) can be determined by the method stated in the section "Content of Constituent Unit Represented by Formula (1) in Aliphatic Polycarbonate" in the Examples. The content of other constituent units can also be determined by adding information of the degree of neutralization, etc.

The lower limit of the mass average molecular weight of the aliphatic polycarbonate is preferably 3000, more preferably 5000, still more preferably 8000, even more preferably 10000, and particularly preferably 100000. The upper limit is preferably 2000000, more preferably 1000000, and particularly preferably 500000. When the mass average molecular weight of the aliphatic polycarbonate is 3000 or more, the viscosity of the paste will be suitable for use as a binder resin. Further, when the mass average molecular weight of the aliphatic polycarbonate is 2000000 or less, the aliphatic polycarbonate achieves suitable solubility in the solvent mentioned above, thus achieving an excellent handling property. The mass average molecular weight is determined as follows.

The mass average molecular weight of the aliphatic polycarbonate is measured by preparing a chloroform solution having an aliphatic polycarbonate concentration of 0.5 mass %, and using high-performance liquid chromatography. After measurement, the mass average molecular weight of the aliphatic polycarbonate is determined by comparison with polystyrene with known mass average molecular weight measured under the same conditions. When the aliphatic polycarbonate used is an aliphatic polycarbonate before neutralization of the side chain containing A in formula (1), the resulting mass average molecular weight can be converted into the mass average molecular weight of the aliphatic polycarbonate after neutralization, based on the percentage of the constituent unit containing such a side chain (i.e., the constituent unit represented by formula (1)) in the resin and the molecular weight of the constituent unit.

The measurement conditions are as follows:
Column: GPC column (trade name: Shodex K-804L, produced by Showa Denko K.K.,)
Column temperature: 40° C.
Eluate: Chloroform
Flow rate: 1.0 mL/min As stated above, the aliphatic polycarbonate of the present invention has a structure of organic onium salt in a side chain. Due to this structure, the aliphatic polycarbonate of the present invention has a low thermal decomposition temperature. More specifically, in the aliphatic polycarbonate of the present invention, the 95% decomposition temperature in a thermogravimetric analysis in a nitrogen atmosphere is preferably 220° C. or lower, more preferably 200° C. or lower, still more preferably 180° C. or lower, and even more preferably 175° C. or lower, 170° C. or lower, or 165° C. or lower. The aliphatic polycarbonate of the present invention is thermally decomposable at the above temperature or lower.

Further, the 5% decomposition temperature is preferably 150° C. or lower, more preferably 145° C. or lower, still more preferably 140° C. or lower, and even more preferably 135° C. or lower. Furthermore, the 50% decomposition temperature is preferably 190° C. or lower, more preferably 170° C. or lower, still more preferably 165° C. or lower, even more preferably 160° C. or lower, and particularly preferably 155° C. or lower. Of these, preferred is the aliphatic polycarbonate in which the 95% decomposition temperature conditions above and the 5% decomposition temperature conditions above are satisfied, or the aliphatic polycarbonate in which the 95% decomposition temperature conditions above and the 50% decomposition temperature conditions above are satisfied, and particularly preferred is the aliphatic polycarbonate in which the 95% decomposition temperature conditions above, the 50% decomposition temperature conditions above, and the 5% decomposition temperature conditions above are satisfied.

The thermal decomposition temperature can be adjusted by the content of the constituent unit represented by formula (1) or a combination of the structure of A$^-$ and HB$^+$. The 5% decomposition temperature refers to a temperature at which the mass loss becomes 5% as the temperature increases at a rate of 10° C./min; the 50% decomposition temperature refers to a temperature at which the mass loss becomes 50% as the temperature increases at a rate of 10° C./min; and the 95% decomposition temperature refers to a temperature at which the mass loss becomes 95% as the temperature increases at a rate of 10° C./min.

The aliphatic polycarbonate of the present invention, which achieves a reduced residual carbon after sintering, and which can be subjected to a dewaxing treatment at low temperatures (preferably 220° C. or lower), is useful as a binder resin used in the production of a molded article. By using the aliphatic polycarbonate of the present invention as a binder resin, not only is a great conservation of energy made possible in the dewaxing step, but also application to substrates not having a very high heat resistance is made possible.

The binder resin composition of the present invention may be the aliphatic polycarbonate of the present invention as is. Alternatively, for example, the binder resin composition of the present invention may be produced by dissolving the aliphatic polycarbonate of the present invention in a solvent that is capable of dissolving the aliphatic polycarbonate of the present invention. The binder resin composition of the present invention may also contain aliphatic polycarbonates other than the aliphatic polycarbonate of the present invention, to an extent that the effects of the present invention are not impaired. Such aliphatic polycarbonates are preferably known as being able to be used as a binder resin.

The binder resin composition of the present invention can be obtained, for example, by dissolving the aliphatic polycarbonate of the present invention in a solvent that is capable of dissolving the aliphatic polycarbonate.

Examples of solvents that are capable of dissolving the aliphatic polycarbonate include, but are not particularly limited to, toluene, ethyl acetate, butyl acetate, isopropyl alcohol, methyl isobutyl ketone, methyl ethyl ketone, N-methyl-2-pyrrolidone, ethylene glycol ethyl ether, ethylene glycol monobutyl ether, ethylene glycol monoethyl ether acetate, diethylene glycol monoethyl ether, diethylene glycol monomethyl ether, diethylene glycol monoisobutyl ether, trimethyl pentanediol monoisobutyrate, ethyl carbitol, butyl carbitol, ethyl carbitol acetate, butyl carbitol acetate, terpineol, terpineol acetate, dihydro terpineol, dihydro terpineol acetate, texanol, isophorone, butyl lactate, dioctyl phthalate, dioctyl adipate, benzyl alcohol, phenylpropylene glycol, cresol, N,N-dimethylformamide, propylene carbonate, and the like. Of these, N-methyl-2-pyrrolidone, terpineol, terpineol acetate, ethyl carbitol acetate, butyl carbitol acetate, texanol, and propylene carbonate are preferable, because they have a moderately high boiling point and are likely to be uniformly volatilized during sintering. These organic solvents may be used singly or in a combination of two or more.

The amount of the solvent to be mixed is preferably 100 to 2000 parts by mass, more preferably 200 to 1500 parts by mass, and even more preferably 300 to 1000 parts by mass, based on 100 parts by mass of all the aliphatic polycarbonates used, from the viewpoint of ease in handling the binder to be obtained.

The binder resin composition of the present invention may optionally further contain additives.

Examples of the additives include adhesion accelerators, surfactants, plasticizers, storage stabilizers, defoaming agents, and the like.

Examples of the adhesion accelerators include amine-based silane coupling agents, glycidyl-based silane coupling agents, and the like. Examples of the surfactants include polyoxyethylene-based surfactants, fatty acid ester-based surfactants, and the like. Examples of the plasticizers include polyether-polyols, phthalate esters, and the like. Examples of the storage stabilizers include amine compounds, carboxylic acid compounds, phosphorus compounds, sulfur compounds, triazole-based compounds, and the like. Examples of the defoaming agents include hydrophobic silicas, polyalkylene derivatives, polyether derivatives, and the like.

The content of the additives in the binder resin composition is preferably 100 parts by mass or less, and more preferably 50 parts by mass or less, based on 100 parts by mass of the binder resin.

EXAMPLES

The present invention is described below in more detail with reference to Production Examples and Examples. However, the present invention is not limited to these Examples. The physical properties of the polycarbonates obtained in the Examples, etc., were measured in accordance with the following methods.

Content of Constituent Unit Represented by Formula (1) in Aliphatic Polycarbonate The compositional ratio of the constituent units in the resin is analyzed by $^1$H-NMR, and the carboxy group content in the aliphatic polycarbonate is determined as the content of the constituent unit represented by formula (1).

In the Examples, the aliphatic polycarbonate is subjected to $^1$H-NMR measurement in deuterated chloroform at 25° C. Then, an integral value (A) of the peak appeared near 5.0 ppm, ascribed to the methine group adjacently attached to the carbonate group and an integral value (B) of the peak appeared near 2.8 ppm, ascribed to the methylene group adjacently attached to the carboxy group are determined, and the carboxy group content is calculated using the following calculation formula.

$$\text{Carboxy group content (\% by mole)}=B/(2\times A)\times 100$$

If the carboxy group content is small, calculation using the above method could be difficult. In this case, assuming that the amount of carboxy group would not change in the step of obtaining a carboxy group-containing polycarbonate from a carboxy group-containing polycarbonate precursor whose carboxy group is protected, the precursor is subjected to $^1$H-NMR measurement in deuterated chloroform at 25° C., and an integral value (C) of the peak appeared near 7.3 to 7.4 ppm, ascribed to the phenyl group in a protecting group and an integral value (D) of the peak appeared near 1.3 to 1.4 ppm, ascribed to the methyl group contained in constituent units not containing a protecting group are determined to calculate the carboxy group content using the following calculation formula.

$$\text{Carboxy group content (\% by mol)}=5\times D/(3\times C+5\times D)\times 100$$

The content of the constituent unit represented by formula (1) is calculated from the carboxy group content obtained using this formula and the content of the organic base reacted with this content.

Mass Average Molecular Weight (Mw) of Aliphatic Polycarbonate

A chloroform solution having an aliphatic polycarbonate concentration of 0.5% by mass is prepared, and subjected to a measurement using high-performance liquid chromatography. After measurement, the mass average molecular weight is determined by comparison with polystyrene with known mass average molecular weight measured under the same conditions. The measurement conditions are as follows:

Column: GPC column (trade name: Shodex K-804L, produced by Showa Denko K.K.)
Column temperature: 40° C.
Eluate: Chloroform
Flow rate: 1.0 mL/min 5% Decomposition Temperature, 50% Decomposition Temperature, and 95% Decomposition Temperature of Aliphatic Polycarbonate Thermal decomposition behaviors are measured by increasing the temperature from room temperature to 400° C. at a heating rate of 10° C./min in a nitrogen atmosphere, using a TG-DTA (Thermo plus EVO2 produced by Rigaku Corporation). For the thermal decomposition temperature, each mass loss temperature is read based on the mass before the initiation of a heating test.

Specifically, a temperature that achieves $(W^0-W^1)/W^0 \times 100=5(\%)$, wherein $W^0$ represents the mass before decomposition, and $W^1$ represents the mass during decomposition, serves as a 5% decomposition temperature; a temperature that achieves $(W^0-W^1)/W^0 \times 100=50(\%)$ serves as a 50% decomposition temperature; and a temperature that achieves $(W^0-W^1)/W^0 \times 100=95(\%)$ serves as a 95% decomposition temperature.

Production Example 1: Production of Cobalt Catalyst

A 0.2-L three-necked flask equipped with a stirrer and a gas inlet tube was charged with 5.0 g (8.3 mmol) of (S,S)—N,N'-bis(3,5-di-tert-butylsalicylidene)-1,2-cyclohexanediaminocobalt (purchased from Aldrich), 1.04 g (8.5 mmol) of benzoic acid, and 100 mL of dichloromethane, and the contents were stirred for 12 hours while introducing air thereinto to allow the components to react. The volatile component was distilled off under a reduced pressure, and thereafter the solid obtained was washed with 100 mL of cold hexane to give a cobalt complex represented by the above formula (4-2) as a brown solid (yield amount: 5.8 g, yield rate: 98.5%).

Production Example 2: Production of benzyl 2-oxiranylaceate

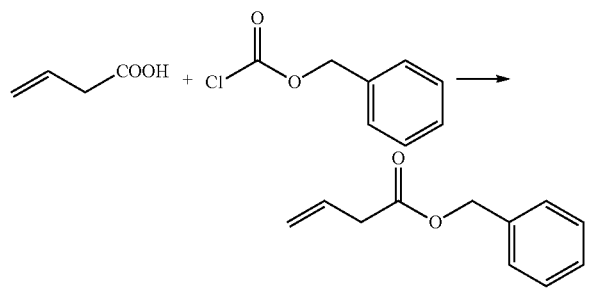

A 1-L four-necked flask equipped with a stirrer, a nitrogen gas inlet tube, a thermometer, and a dropping funnel was charged with 51.3 g (0.59 mol) of 3-butenoic acid, 117.9 g (1.49 mol) of pyridine, and 752 g of dichloromethane. Next, the reactor was cooled to 10° C. or lower in an ice-water bath, 106.7 g (0.62 mol) of benzyl chloroformate was added thereto from the dropping funnel at a rate of 2.5 mL/min in a nitrogen atmosphere, and the resulting mixture was allowed to react while stirring for 8 hours such that the internal temperature did not exceed 20° C. Thereafter, the precipitated solid was removed by filtration, and the filtrate was washed with saturated aqueous ammonium chloride to remove the excess pyridine. After the organic layer was dried over sodium sulfate, concentration was performed, and dichloromethane was distilled off. The residual yellow liquid was purified by silica gel column chromatography (n-hexane/ethyl acetate=40/1 (v/v), Rf value: 0.33) to give benzyl 3-butenoate as a pale yellow liquid (yield amount: 74.4 g, yield rate: 72.3%).

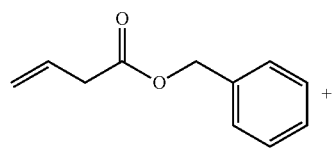

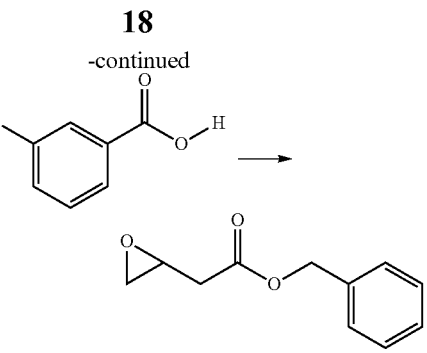

A 1-L four-necked flask equipped with a stirrer, a nitrogen gas inlet tube, and a thermometer was charged with 37.6 g (0.21 mol) of benzyl 3-butenoate and 528 g of dichloromethane. The reactor was cooled to 5° C. or lower in an ice-water bath, and 100 g (0.40 mol) of 70% m-chloroperbenzoic acid was added thereto in 10 divided portions in a nitrogen atmosphere. The resulting mixture was allowed to react while stirring for 18 hours such that the internal temperature did not exceed 20° C. Thereafter, cooling was performed to an internal temperature of 5° C. or lower, and the resulting solid was removed by filtration. A saturated aqueous sodium thiosulfate solution and saturated sodium bicarbonate solution were added to the obtained filtrate to consume unreacted m-chloroperbenzoic acid. After the organic layer was dried over sodium sulfate, concentration was performed, and dichloromethane was distilled off. The residual yellow liquid was purified by silica gel column chromatography (n-hexane/ethyl acetate=10/1 (v/v), Rf value: 0.31) to give benzyl 2-oxiranylaceate as a pale yellow liquid (yield amount: 37.8 g, yield rate: 92.0%).

Example 1: Production of Aliphatic Polycarbonate

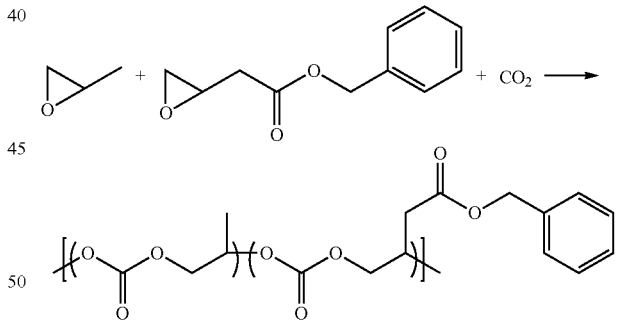

A 1-L autoclave was charged with 0.031 g (0.032 mmol) of the cobalt catalyst obtained in Production Example 1, and 0.020 g (0.024 mmol) of bis(triphenylphosphoranylidene) ammonium chloride, and further charged with 5.0 mL (71 mmol) of propylene oxide and 0.42 mL (2.1 mmol) of the epoxide (benzyl 2-oxiranylaceate) obtained in Production Example 2. Next, carbon dioxide was added thereto while stirring until the internal reaction system reached 1.5 MPa. Thereafter, the polymerization reaction was carried out at 25° C. for 21 hours. After completion of the reaction, the autoclave was depressurized, and methanol was added thereto to precipitate a white solid. The obtained white solid was dried under reduced pressure to give 6.0 g of polycarbonate. The obtained polycarbonate had a mass average molecular weight of 11300, and the amount of benzyl ester group introduced was 2% by mole.

The structure of the obtained polycarbonate was identified by $^1$H-NMR.

TABLE 1

$^1$H-NMR (CDCl$_3$) δ 7.4-7.3 (5H, —C$_6$H$_5$), 5.3 (1H, —C—CH—C—CO—), 5.2-5.1 (2H, —O—CH$_2$—Ph), 5.1-4.9 (1H, —(CO)O—CH—), 4.4-4.1 (2H, —CH$_2$—O(CO)—), 2.8-2.7 (2H, —C—CH$_2$—CO—) 1.4-1.3 (3H, —CH$_3$) ppm.

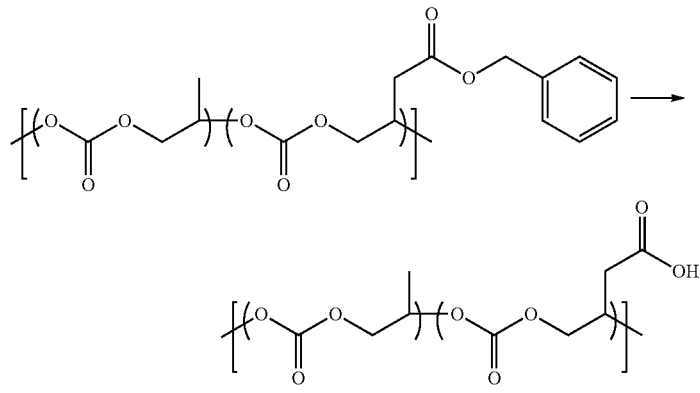

Next, a 1-L four-necked flask equipped with a stirrer, a gas introducing tube, and a thermometer was charged with 4.7 g of polycarbonate obtained above, 1.2 g of 10% palladium carbon, 20 mL of ethyl acetate, and 10 mL of methanol. The inside of the reactor was replaced with hydrogen, and the contents were allowed to react while stirring at 40° C. under 1 atmosphere of hydrogen for 20 hours. The solid was then removed by filtration, the filtrate obtained was concentrated, and the concentrated filtrate was poured into methanol to precipitate a polymer. The obtained polymer was dried to give 4.1 g of a carboxy group-containing polycarbonate. The obtained polycarbonate had a mass average molecular weight of 9000.

The structure of the obtained polycarbonate was identified by $^1$H-NMR and $^{13}$C-NMR.

TABLE 2

$^1$H-NMR (CDCl$_3$) δ = 5.3 (1H, —C—CH—C—), 5.1-5.0 (1H, —(CO)O—CH—), 4.5-4.1 (2H, —CH$_2$—O (CO)—), 2.8-2.7 (2H, —C—CH$_2$—CO—), 1.4-1.3 (3H, —CH$_3$) ppm.
$^{13}$C-NMR (CDCl$_3$) δ = 173.9 (—COOH), 154.6-154.2 (—O (CO)O—), 72.4-71.8 (—O—CH—CH$_2$—O—), 69.2-68.9 (—O—CH—CH$_2$—O—), 35.1 (—CH$_2$—COOH), 16.0 (—CH$_3$)

Next, 50 mg of the carboxy group-containing polycarbonate obtained above was dissolved in 2 mL of methylene chloride, and 1.4 mg (2 mol %) of 1,8-diazabicyclo[5.4.0]undec-7-ene was added thereto, followed by stirring at room temperature for 30 minutes. The obtained solution was concentrated and dried to give a polycarbonate in which the side chain was neutralized with 1,8-diazabicyclo[5.4.0]undec-7-ene. The obtained polycarbonate had a mass average molecular weight of 9000, the 5% thermal decomposition temperature was 120° C., the 50% decomposition temperature was 144° C., and the 95% thermal decomposition temperature was 161° C.

As stated above, the amount of benzyl ester group (protecting group) introduced in the precursor was 2% by mole; thus, the percentage of carboxy group introduced as a result of deprotection was also 2% by mole. Therefore, the content of the constituent unit containing the conjugate base (COO$^-$) of a carboxylic acid obtained by neutralization and an organic onium ion of 1,8-diazabicyclo[5.4.0]undec-7-ene in the side chain was also 2% by mole (the degree of neutralization: 100%).

The following is the structural formula of 1,8-diazabicyclo[5.4.0]undec-7-ene.

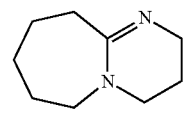 [SMILES: C1CCC2=NCCCN2CC1]

Example 2

The reaction was carried out in the same manner as in Example 1, except that the organic amine used for neutralization was changed from 1.4 mg (2 mol %) of 1,8-diazabicyclo[5.4.0]undec-7-ene to 1.0 mg (2 mol %) of 1,4-diazabicyclo[2.2.2]octane (DABCO), to give a polycarbonate whose side chain was neutralized with DABCO. The obtained polycarbonate had a mass average molecular weight of 9000, the 5% thermal decomposition temperature was 131° C., the 50% decomposition temperature was 190° C., and the 95% decomposition temperature was 219° C.

The following is the structural formula of 1,4-diazabicyclo[2.2.2]octane.

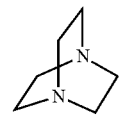

Example 3

The reaction was carried out in the same manner as in Example 1, except that the organic amine used for neutralization was changed from 1.4 mg (2 mol %) of 1,8-diazabicyclo[5.4.0]undec-7-ene to 1.4 mg (2 mol %) of 7-methyl-1,5,7-triazabicyclo[4.4.0]dec-5-ene, to give a polycarbonate whose side chain was neutralized with 7-methyl-1,5,7-triazabicyclo[4.4.0]dec-5-ene. The obtained polycarbonate had a mass average molecular weight of 9100, the 5% thermal decomposition temperature was 130° C., the 50% decomposition temperature was 144° C., and the 95% decomposition temperature was 155° C.

The following is the structural formula of 7-methyl-1,5,7-triazabicyclo[4.4.0]dec-5-ene.

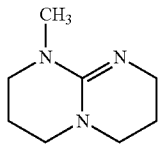

Example 4

The reaction was carried out in the same manner as in Example 3, except that the amount of the 7-methyl-1,5,7-triazabicyclo[4.4.0]dec-5-ene added for neutralization was changed from 1.4 mg (2 mol %) to 0.7 mg (1 mol %), to give a polycarbonate in which only 1% by mole of the side chain per 2% by mole of the side chain was neutralized with 7-methyl-1,5,7-triazabicyclo[4.4.0]dec-5-ene. The obtained polycarbonate had a mass average molecular weight of 9100, the 5% thermal decomposition temperature was 138° C., the 50% decomposition temperature was 150° C., and the 95% decomposition temperature was 156° C. (the degree of neutralization: 50%).

Comparative Example 1

A polypropylene carbonate was obtained under the same conditions as Example 1 using only propylene oxide as an epoxide. The obtained polypropylene carbonate had a mass average molecular weight of 61000, the 5% thermal decomposition temperature was 204° C., the 50% decomposition temperature was 217° C., and the 95% decomposition temperature was 289° C.

Comparative Example 2

The reaction was carried out in the same manner as in Example 1, except that the carboxylic acid in the side chain was not neutralized, to give a polycarbonate. The obtained polycarbonate had a mass average molecular weight of 9100, the 5% thermal decomposition temperature was 157° C., the 50% decomposition temperature was 176° C., and the 95% decomposition temperature was 236° C.

Comparative Example 3

When 1,8-diazabicyclo[5.4.0]undec-7-ene was added to the polycarbonate of Comparative Example 1, decomposition occurred rapidly even at room temperature. The thermal decomposition behaviors of the aliphatic polycarbonate obtained in Example 1 and the aliphatic polycarbonates obtained in Comparative Examples 1 and 2 were measured. FIG. 1 shows the TG curves obtained by the measurement. The results showed a considerable decrease in the thermal decomposition temperature of the aliphatic polycarbonate obtained in Example 1.

The Examples and Comparative Examples demonstrated that the introduction of an acid moiety into a polycarbonate side chain, followed by neutralization of the side chain, enabled a considerable decrease in the thermal decomposition temperature. According to the Examples and Comparative Example 3, it was revealed that the aliphatic polycarbonate of the present invention did not undergo decomposition even with the addition of a strong organic base that usually decomposes polycarbonates rapidly, and revealed that the aliphatic polycarbonate of the present invention exhibits excellent storage stability.

INDUSTRIAL APPLICABILITY

The use of the present invention enables calcination at low temperatures (preferably 220° C. or lower), and not only is a great conservation of energy made possible in the debinding step, but also application to plastic substrates not having a very high heat resistance is made possible.

The invention claimed is:

1. An aliphatic polycarbonate comprising a constituent unit represented by formula (1):

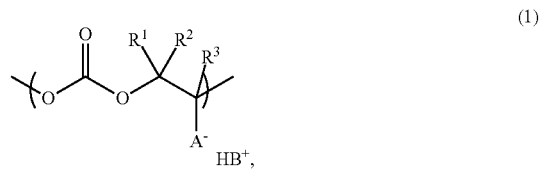

wherein $R^1$, $R^2$, and $R^3$ are identical or different, and each represents a hydrogen atom, an alkyl group having 1 to 10 carbon atoms, or an aryl group having 6 to 20 carbon atoms, $A^-$ represents a conjugate base of a Brønsted acid, and $HB^+$ represents an organic onium ion.

2. The aliphatic polycarbonate according to claim 1, wherein $HB^+$ in formula (1) represents a conjugate acid of an organic amine compound.

3. The aliphatic polycarbonate according to claim 2, wherein the organic amine compound is at least one member selected from the group consisting of 1,8-diazabicyclo[5.4.0]undec-7-ene, 1,4-diazabicyclo[2.2.2]octane, and 7-methyl-1,5,7-triazabicyclo[4.4.0]dec-5-ene.

4. The aliphatic polycarbonate according to claim 1, comprising a constituent unit represented by formula (1'), wherein $A^-$ in formula (1) represents a conjugate base ($COO^-$) of a carboxylic acid:

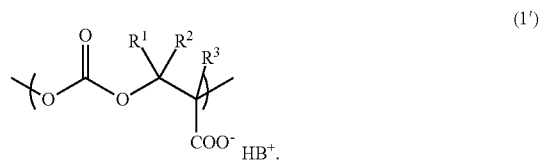

5. The aliphatic polycarbonate according to claim 1, further comprising a constituent unit represented by formula (2):

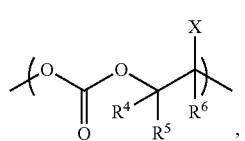
(2)

wherein $R^4$, $R^5$, and $R^6$ are identical or different, and each represents a hydrogen atom, an alkyl group having 1 to 10 carbon atoms, or an aryl group having 6 to 20 carbon atoms, wherein two groups from among $R^4$ to $R^6$, taken together with the carbon atom or carbon atoms to which these groups are attached, may form a substituted or unsubstituted, saturated or unsaturated aliphatic ring, and X represents a hydrogen atom, an alkyl group having 1 to 10 carbon atoms, a haloalkyl group having 1 to 10 carbon atoms, a cycloalkyl group having 3 to 12 carbon atoms, an ether bond-containing group, an ester bond-containing group, or an allyl group.

6. The aliphatic polycarbonate according to claim 1, wherein the content of the constituent unit represented by formula (1) is 0.01 to 30 mol %.

7. The aliphatic polycarbonate according to claim 1, wherein the 95% decomposition temperature in a thermogravimetric analysis in a nitrogen atmosphere is 220° C. or lower.

8. A binder resin composition comprising the aliphatic polycarbonate of claim 1.

\* \* \* \* \*